US 9,025,318 B2

(12) United States Patent
Ashcraft et al.

(10) Patent No.: US 9,025,318 B2
(45) Date of Patent: May 5, 2015

(54) STYLUS HAVING A RETRACTABLE CONNECTOR

(75) Inventors: Britt C Ashcraft, Tomball, TX (US); Eric Chen, Houston, TX (US); Michael Delpier, Houston, TX (US); Dustin L Hoffman, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 69 days.

(21) Appl. No.: 13/560,750

(22) Filed: Jul. 27, 2012

(65) Prior Publication Data
US 2014/0029182 A1 Jan. 30, 2014

(51) Int. Cl.
H05K 5/00 (2006.01)
H05K 7/00 (2006.01)
H01R 13/62 (2006.01)
G06F 1/26 (2006.01)
G06F 3/0354 (2013.01)

(52) U.S. Cl.
CPC .............. *G06F 1/26* (2013.01); *G06F 3/03545* (2013.01); *H01R 2201/06* (2013.01)

(58) Field of Classification Search
USPC ............. 361/679.01, 679.02, 679.08, 679.09, 361/679.2, 679.3, 679.26–679.29, 361/679.37–679.39, 679.4, 679.41–679.44, 361/679.55–679.59; 345/156, 157, 168, 345/169, 184; 455/575.1, 575.3, 575.4, 455/575.8
See application file for complete search history.

(56) References Cited

U.S. PATENT DOCUMENTS

| 7,887,342 | B1* | 2/2011 | Yu ................................. 439/131 |
| 8,519,985 | B2* | 8/2013 | Feng et al. .................... 345/179 |
| 2006/0197755 | A1* | 9/2006 | Bawany ....................... 345/179 |
| 2006/0250787 | A1 | 11/2006 | Ho et al. |
| 2008/0180411 | A1* | 7/2008 | Solomon et al. ............. 345/179 |
| 2010/0075517 | A1* | 3/2010 | Ni et al. ....................... 439/131 |
| 2011/0279081 | A1 | 11/2011 | Cacioppo et al. |

OTHER PUBLICATIONS

Grabkowski, L.R.; "How Do I Charge My Battery on My Fly Fusion?"; 2 pages.
McGann, B.; "Livescribe Pulse Smartpen"; Sep. 2010; 8 pages.

* cited by examiner

*Primary Examiner* — Jerry Wu
(74) *Attorney, Agent, or Firm* — Hewlett-Packard Patent Department

(57) ABSTRACT

Embodiments of the present invention disclose a stylus having a retractable connector for use with a computing device. According to one embodiment, the stylus includes an outer housing and a connector configured to attach to a port on the computing device so as to maintain the stylus in a fixed position adjacent to the computing device. Furthermore, the connector is capable of extending from the housing of the stylus into a first position and also retracting into the stylus housing into a second position.

20 Claims, 5 Drawing Sheets

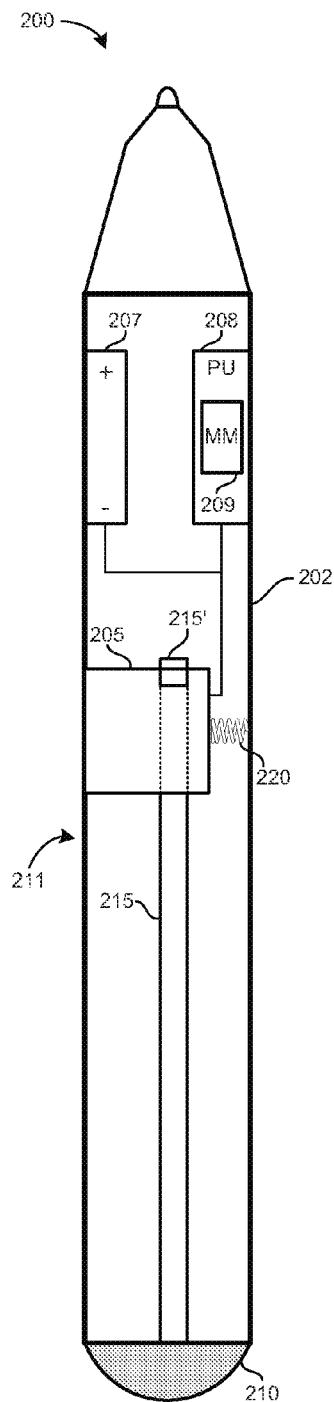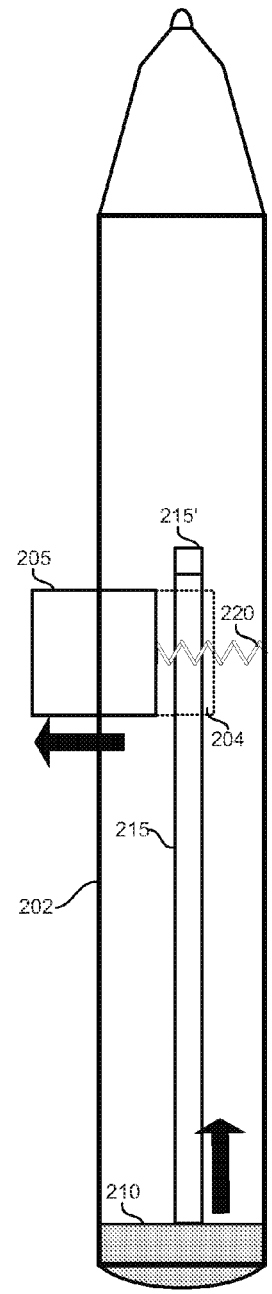
FIG. 2A          FIG. 2B

STYLUS HAVING A RETRACTABLE CONNECTOR

BACKGROUND

Providing efficient and intuitive interaction between a computer system and users thereof is essential for delivering an engaging and enjoyable user-experience. Today, most computer systems include a keyboard for allowing a user to manually input information into the computer system, and a mouse for selecting or highlighting items shown on the display. As computer systems have grown in popularity, however, alternate input systems have been developed. For example, stylus input systems provide a natural user interface to computer systems by enabling a specific point on the display screen to be selected or identified when the user physically touches the display with a pen-like device or stylus.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIGS. 2A and 2B are simplified schematic drawings of a pen stylus and retractable input connector according to an example of the present invention.

DETAILED DESCRIPTION OF THE INVENTION

Figure 1:
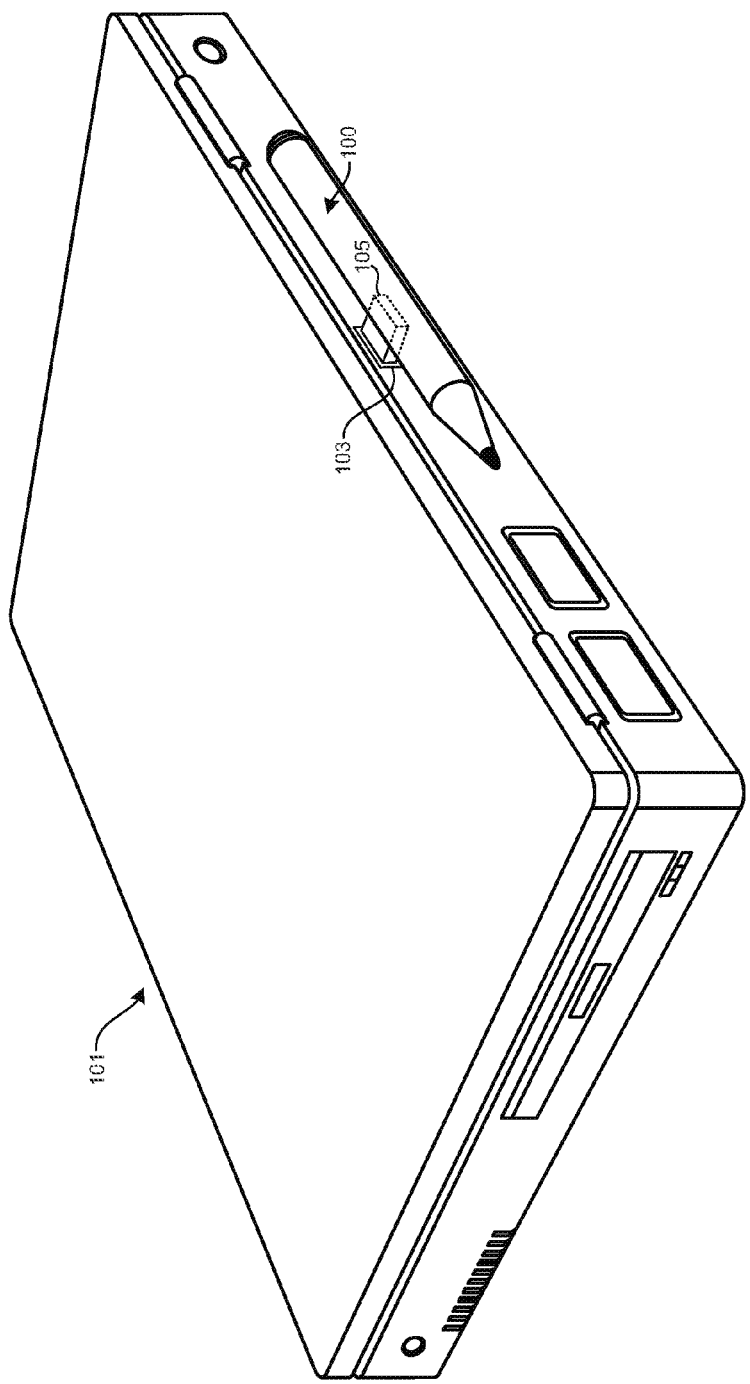
FIG. 1 is a three-dimensional perspective view of a stylus and retractable input connector coupled to a notebook computer according to an example of the present invention.

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Generally, a stylus falls into two disparate categories: 1) an inexpensive pen-shaped stylus that lacks electrical components and simply acts as a selection mechanism in the same way as a user's fingers, and 2) a high-tech stylus that includes several electrical components for providing additional functionality. The latter category of styli requires battery power, which can make the stylus bulky and heavy. Moreover, the use of stand-alone batteries is often troublesome for the operating user through continuous changing of the batteries while also contributing to environmental waste. Other pen-shaped devices contain a built-in connector capable of powering the device, yet the connector is often hidden by additional parts that require the user's attention so as to not misplace the part (e.g. cap). Thus, there is a need in the art for electronic pen stylus having a rechargeable battery system within a compact, robust, and aesthetically-pleasing housing design.

Examples of the present invention disclose a pen stylus having a retractable input connector. According to one example, the housing of the stylus includes an inner cavity area that houses the retractable input connector. The stylus also includes an activation element or button for ejecting the retractable connector from inner cavity area of the stylus. Once ejected, the retractable connector may be plugged into the receptacle or port of a computing device so as to power the pen stylus. As a result, the present example embodiments provide a mechanical and user-friendly pen stylus that can communicate and recharge on any powered computing device having a corresponding port.

Referring now in more detail to the drawings in which like numerals identify corresponding parts throughout the views, FIG. 1 is a three-dimensional perspective view of a stylus and retractable input connector coupled to a notebook computer according to an example of the present invention. As shown here, a pen stylus 200 is coupled with a portable computing device 201 such that the pen stylus 200 lies immediately adjacent and horizontally-aligned with a side of computing device. More particularly, the pen stylus 200 includes a retractable input connector 205 that corresponds with the port 203 of the computing device 101, in the present example, the input connector 105 of the stylus 100 represents a Universal Service Bus (USB) connector plug, which is configured to mate with a USB port of the portable computing device 101. However, the connector 105 of the stylus 100 and corresponding port 103 on the computing device may be a Micro or Ming USB connector/plug, IEEE 1394 interface connector/plug, or any other communications protocol capable of providing communication and/or power between two connected electronic devices. By incorporating the input connector 105 (e.g., USB plug) into the stylus body, one can insert the stylus 100 directly into the computing device 101 in order to utilize the device's powering function to recharge the stylus and/or exchange data therewith. As such, an innovative and environmentally-friendly solution is created through utilization of existing functionality.

FIGS. 2A and 2B are simplified schematic drawings of a pen stylus and retractable input connector according to an example of the present invention. As shown in FIG. 2A, the pen stylus 200 includes a movable activation member 210, an elastic ejection mechanism 220, and an input connector 205 coupled to a battery unit 207 and a processing unit 208 and memory module 209. Moreover, FIG. 2A depicts the input connector in a first or retracted position within the pen stylus 200. The processing unit 208 represents a central processing unit (CPU), microcontroller, microprocessor, or logic configured to execute programming instructions, while memory module 209 represents volatile or non-volatile memory configured to store programs, instructions, and/or data for use by the stylus processing unit 208 or a secondary computing system. According to one example, the latch arm 215 is coupled with the activation member 210 and includes an attachment portion 215' for engaging and securing the connector portion in a fixed position within the cavity area 204. For instance, the attachment portion 215' of the latch arm 215 may represent a magnet for joining with a magnetic area of the input connector 205. When in the first position, the input connector 205 is anchored within inner cavity 204 of the stylus 200 via the attachment portion 215' such that the elastic member 220 (e.g., compression spring) remains in a compressed state. As shown here, the connector 205 also remains substantially flush with the ejection surface/edge 211 of the pen stylus 200 when in the retracted position. Referring now to FIG. 2B, the input connector 205 is ejected from the cavity area 204 into a second position partially outside the stylus 200. Upon a user depressing the button or activation member 210, the latch arm 215 extends towards an opposite end of the stylus as indicated by the directional arrow so as to cause the attachment portion 215' to disengage from the input connector 205. Consequently, the inner spring 220 expands or decompresses so as to eject the input connector 205 from the inner cavity area 204 of the stylus 200. As shown in FIG. 2B, the input connector 205 extends perpendicularly (directional arrow) from the ejection side 211 of the housing 202.

Figure 3A:
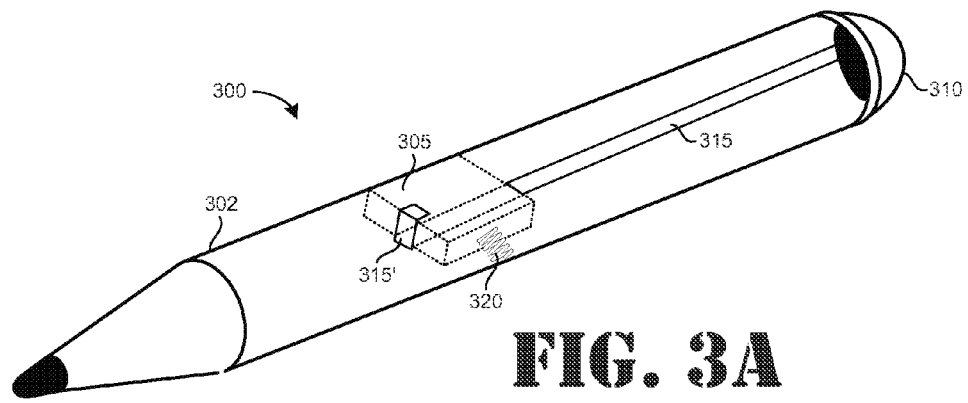
FIGS. 3A-3C are three-dimensional schematic views of the pen stylus and retractable input connector according to an example of the present invention.
Figure 3B:
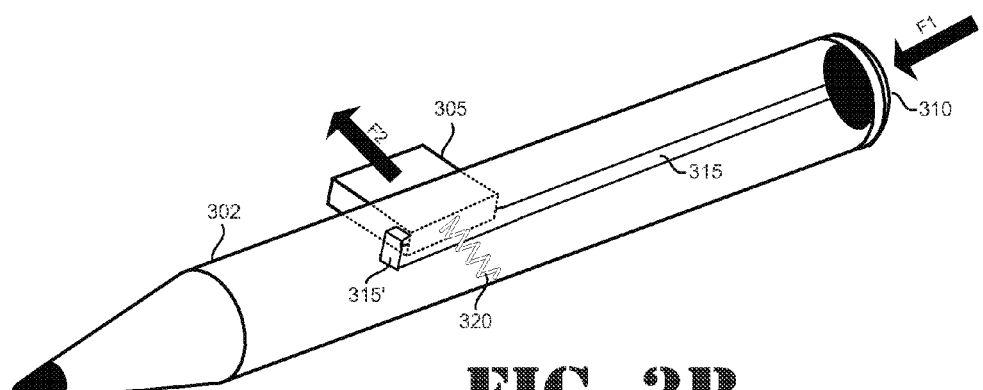
Figure 3C:
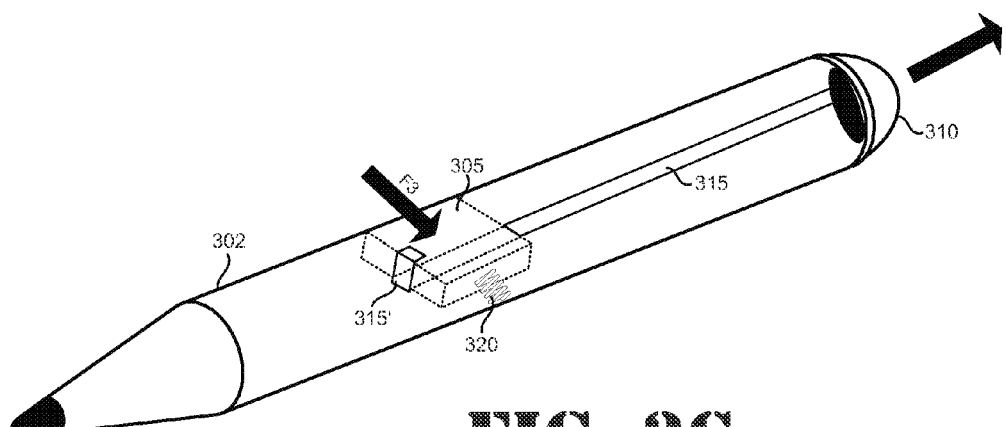

FIGS. 3A-3C are three-dimensional schematic views of the pen stylus and retractable input connector according to an example of the present invention. In FIG. 3A, the input connector 305 of the stylus 300 rests in a first or retracted position within the stylus housing 302. As explained above, the spring is compressed and the attachment portion 315' of the latch member is joined with the at least one side of the input connector. In the present example, the attachment portion 315' is engaged with both an upper and side surface of the input connector 305 for providing a more secure coupling effect. FIG. 3B depicts depression of the activation member 310, which is formed at a bottom end of the pen stylus 300 (end opposite the narrowed tip end). However, examples of the present invention are not limited thereto as the activation member 310 could be formed at the tip end or along the side of the stylus housing 302 for example. As shown here (via directional arrows), inward force F1 (i.e., depression) directed at the activation member serves to cause the latch arm 315 to move in the same inward direction such that the attachment portion 315' disjoins from the contact surfaces (e.g., upper and side surface) of the input connector 305. Since the clamping forces (via magnetism) of the attachment portion 315' on the connector 305 are removed, the inner spring 320 is free to expand thereby moving a portion of the input connector 305 outside the stylus housing as indicated by the directional force arrow F2. Meanwhile, FIG. 3C depicts the input connector 305 returning from the extended second position shown in FIG. 3B back to the first retracted position within the stylus housing. Here, inward force F3 received at the input connector 305 causes the inner spring 320 to move from an expanded state to a compressed state as in FIG. 3A. Then, the attachment portion 315' may rejoin with the input connector (e.g., magnet engages with metallic surface of USB port) and cause the latch arm 315 and movable activation member 310 to extend outward and away from a central area of the stylus housing.

Figure 4A:
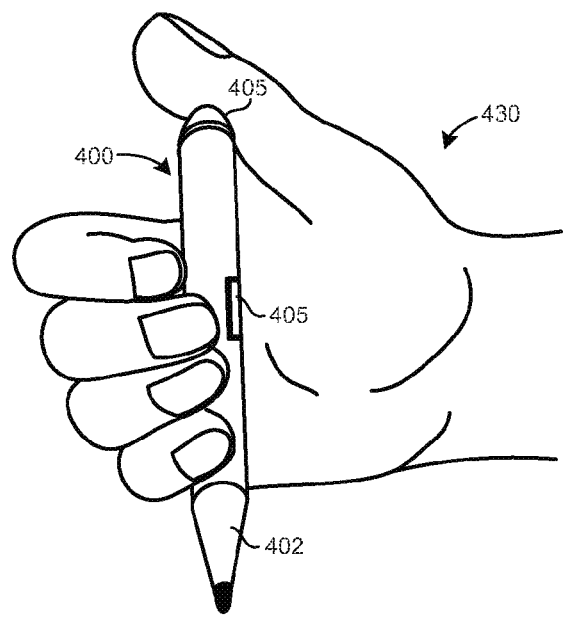
FIGS. 4A and 4B illustrate a user operating the pen stylus to eject the retractable input connector from the stylus in accordance with an example of the present invention.
Figure 4B:
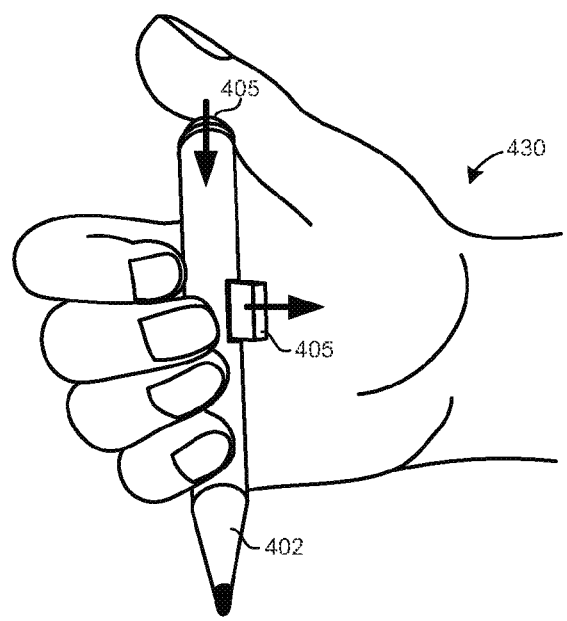

FIGS. 4A and 4B illustrate a user operating the pen stylus to eject the retractable input element from the stylus in accordance with an example of the present invention. As shown in the example embodiment of FIG. 4A, an operating user 430 holds the pen stylus 400 in a vertical or upright angle. The input connector 405 rests within the housing 401 in a first or retracted position. More particularly, the connecting end of the input connector 405 lies substantially flush with an edge of the stylus housing 402. In FIG. 4B, the operating user 430 presses the activation button or movable member 405 in a downward direction towards an opposite end of the stylus housing 402. According to one example, such action causes the input connector 405 to eject and protrude from the internal area of the housing 402 into a second or extended position. As depicted in FIG. 1, the input connector 405 of the pen stylus 400 can then be inserted into a compatible port of an electronic device in order to charge the stylus (via the battery module) or exchange data with the computing device (via processing unit and memory module).

Figure 5A:
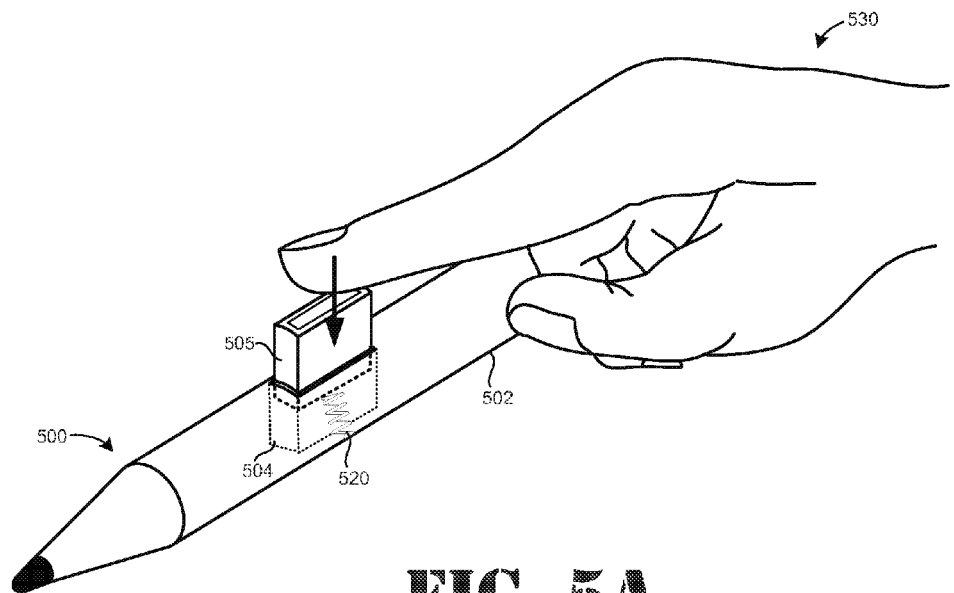
FIGS. 5A and 5B illustrate a user operating the pen stylus to reposition the retractable input connector back into the stylus in accordance to an example of the present invention.
Figure 5B:
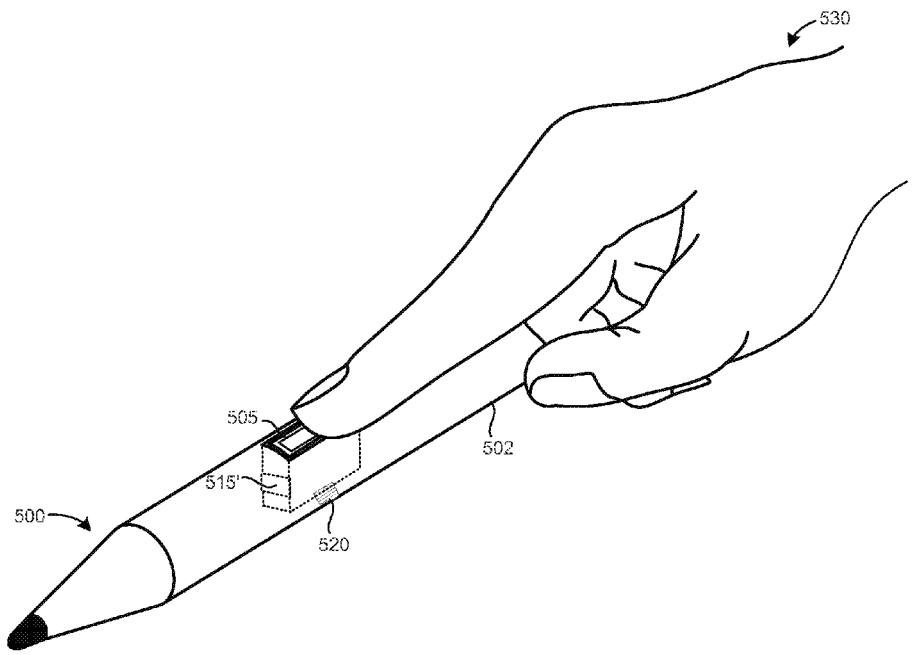

FIGS. 5A and 5B illustrate a user operating the pen stylus to reposition the retractable input element back into the stylus in accordance to an example of the present invention. As shown in FIG. 5A, a portion of input connector 505 remains in a protruding position outside the stylus housing 502, while the inner spring 520 remains in an extended or decompressed state. An operating user 530 may then use a finger to depress the input connector 505 in order to reposition the connector 505 back within the internal cavity 504 of the stylus housing 502 (FIG. 5B). Specifically, the input connector 505 is returned to the retracted position in which: 1) the entire input connector 505 is within the cavity area 504 of the stylus housing 502, 2) the inner spring 520 is in a compressed state, and 3) the attachment portion 515' engages with at least one engaging surface of the input connector 505.

Embodiments of the present invention provide retractable input connector for a pen stylus. Many advantages are afforded by the pen stylus and retractable input connector in accordance with embodiments of the present invention. For instance, the present examples utilize standard features and functionality of existing computing devices to charge and communicate with the pen stylus. Furthermore, users no longer need to carry an additional charging unit or remove/replace batteries when the power of the pen stylus depletes. Moreover, incorporation of the input connector directly into the stylus housing helps to eliminate any superfluous parts or items as used in prior solutions.

Furthermore, while the invention has been described with respect to exemplary embodiments, one skilled in the art will recognize that numerous modifications are possible. For example, although exemplary embodiments depict a notebook computer as the portable computing device, the invention is not limited thereto. For example, the computing device may be a netbook, a tablet personal computer, a smart phone, or any other computing device having compatible input ports and communicative/powering functionality.

Furthermore, the inner cavity area and input connector may be positioned along any area of the stylus rather the central area described and depicted in the present examples. Additionally, the attachment portion may comprise of any adhesive or bonding material capable or simple attachment and detachment to/from the input connector. Thus, although the invention has been described with respect to exemplary embodiments, it will be appreciated that the invention is intended to cover all modifications and equivalents within the scope of the following claims.

What is claimed is:

1. A stylus comprising:
   a housing;
   a connector to attach to a port on a computing device; and
   a moveable activation member formed at an axial end of the housing,
   wherein activation of the moveable activation member extends the connector perpendicularly from a lengthwise side of the housing, the moveable activation member being activated by a force applied in an axial direction of the housing, and
   wherein pressing of the connector causes retraction of the connector into the housing.

2. The stylus of claim 1, further comprising:
   an arm member coupled to the moveable activation member and having an attachment portion for holding the connector in a retracted position within a cavity area of the housing.

3. The stylus of claim 2, further comprising:
   an elastic member formed within the housing and coupled to the connector, wherein the elastic member expands so as to eject the connector from the cavity area of the housing when the attachment portion detaches from the connector portion upon activation of the moveable activation member.

4. The stylus of claim 1, wherein the connector extends from a central area of the lengthwise side of the housing.

5. The stylus of claim 1, wherein the connector is usable to charge the stylus through connection with the computing system.

6. The stylus of claim 1, wherein the connector is usable to transfer data from to/from a memory unit of the stylus and the computing system.

7. The stylus of claim 1, wherein the connector is a universal serial bus (USB) connector plug.

8. A stylus device comprising:
   a housing having an inner cavity area;
   a connector to extend perpendicularly from a lengthwise side of the housing in a first position and retract into the inner cavity area of the housing in a second position, wherein when in the first position the connector is to connect to a corresponding port of a computing device; and
   a moveable activation member formed at an axial end of the housing, wherein activation of the moveable activation member moves the connector from the second position to the first position, wherein the moveable activation member is activated by a force applied in an axial direction of the housing.

9. The stylus device of claim 8, further comprising:
   a processing unit and memory module configured to transfer and save data; and
   a battery module for powering the stylus device.

10. The stylus device of claim 8, further comprising:
    an arm member coupled to the moveable activation member and having an attachment portion for holding the connector in the second position within the cavity area.

11. The stylus device of claim 10, further comprising:
    an elastic member formed within the housing and coupled to the connector, wherein the elastic member expands so as to eject the connector from the cavity area when the attachment portion detaches from the connector portion.

12. The stylus device of claim 9, wherein the connector is usable to charge the battery module through connection with a computing system.

13. The stylus device of claim 12, wherein the connector is usable to transfer data to/from the memory module and the computing system.

14. The stylus device of claim 8, wherein the connector is a universal serial bus (USB) connector plug.

15. A stylus for a computing device comprising:
    a housing having a cavity area therein;
    a connector portion to attach to a port on the computing device to maintain the stylus in a fixed position adjacent and parallel with a side of the computing device;
    a moveable activation member formed at an axial end of the housing;
    an arm member coupled to the moveable activation member and having an attachment portion for holding the connector portion in a fixed position within the cavity area of the housing;
    an elastic member coupled to the connector portion, the elastic member being a compression spring, wherein expansion of the elastic member causes the connector portion to move from the fixed position within the cavity area to a protruding position outside the cavity area and perpendicular to a lengthwise side of the housing; and
    wherein activation of the moveable activation member causes the attachment portion to detach from the connector portion and the elastic member to expand and eject the connector portion from said cavity area through an opening in the lengthwise side of the housing, the moveable activation member being activated by a force applied in an axial direction of the housing.

16. The stylus of claim 15, further comprising:
    a processing unit and memory module configured to transfer and save data; and
    a battery module for powering the stylus device.

17. The stylus of claim 16, wherein the connector portion is usable to charge the battery module through connection with the computing system.

18. The stylus of claim 16, wherein the connector portion is usable to transfer data to/from the memory module of the stylus and the computing system.

19. The stylus of claim 15, wherein the connector portion is a universal serial bus (USB) connector plug.

20. The stylus of claim 1, wherein the moveable activation member includes a compression spring.

* * * * *